(12) United States Patent
Li et al.

(10) Patent No.: US 12,216,307 B2
(45) Date of Patent: Feb. 4, 2025

(54) BACKLIGHT MODULE AND DISPLAY APPARATUS

(71) Applicants: Hefei Xinsheng Optoelectronics Technology Co., Ltd., Anhui (CN); BOE Technology Group Co., Ltd., Beijing (CN)

(72) Inventors: Hailong Li, Beijing (CN); Yudong Liu, Beijing (CN); Ning Wang, Beijing (CN)

(73) Assignees: Hefei Xinsheng Optoelectronics Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/026,329

(22) PCT Filed: Mar. 28, 2022

(86) PCT No.: PCT/CN2022/083442
§ 371 (c)(1),
(2) Date: Mar. 14, 2023

(87) PCT Pub. No.: WO2023/184097
PCT Pub. Date: Oct. 5, 2023

(65) Prior Publication Data
US 2024/0302584 A1   Sep. 12, 2024

(51) Int. Cl.
*F21V 8/00* (2006.01)
(52) U.S. Cl.
CPC ......... *G02B 6/0066* (2013.01); *G02B 6/0091* (2013.01)

(58) Field of Classification Search
CPC .................. G02B 6/0066; G02B 6/0091
See application file for complete search history.

(56) References Cited

U.S. PATENT DOCUMENTS

| 2012/0069263 | A1 | 3/2012 | Hur et al. |
| 2014/0132889 | A1 | 5/2014 | Li |
| 2016/0170130 | A1* | 6/2016 | Jin ............................. C09J 7/29 |
| | | | 428/354 |
| 2018/0210129 | A1* | 7/2018 | Uno .......................... G02B 5/08 |
| 2019/0022406 | A1* | 1/2019 | Hill ...................... A61F 13/0206 |

(Continued)

FOREIGN PATENT DOCUMENTS

| CN | 101038401 A | 9/2007 |
| CN | 102411230 A | 4/2012 |

(Continued)

*Primary Examiner* — Evan P Dzierzynski
(74) *Attorney, Agent, or Firm* — IPro, PLLC (57) ABSTRACT

Disclosed are a backlight module and a display apparatus. The backlight module includes a light guide plate (1), a light emitting surface (11) is divided into a light emitting region (A) and a peripheral region (B) surrounding the light emitting region (A); a lamp bar (2) having a light emergent direction facing a light incident surface (13); and a circuit board (3) connected with the lamp bar (2) and positioned at a side of a bottom surface (12) of the light guide plate (1), an overlapping portion between the circuit board (3) and the light guide plate (1) is formed into a connection region, and an orthographic projection of the connection region on the light emitting surface (11) is completely covers the peripheral region (B) and at least partially covers the light emitting region (A).

13 Claims, 3 Drawing Sheets

(56) References Cited

U.S. PATENT DOCUMENTS

| | | | | |
|---|---|---|---|---|
| 2019/0155115 A1* | 5/2019 | Sakamoto | ............ | G02F 1/1343 |
| 2020/0225398 A1* | 7/2020 | Zhang | ................. | G02B 6/0016 |
| 2020/0400872 A1* | 12/2020 | Chen | ................... | G02B 6/0055 |

FOREIGN PATENT DOCUMENTS

| | | |
|---|---|---|
| CN | 102621744 A | 8/2012 |
| CN | 102681049 A | 9/2012 |
| CN | 204313125 U | 5/2015 |
| CN | 112099263 A | 12/2020 |

* cited by examiner

BACKLIGHT MODULE AND DISPLAY APPARATUS

CROSS REFERENCE TO RELATED APPLICATIONS

The present disclosure is a national phase entry under 35 U.S.C § 371 of International Application No. PCT/CN2022/083442, filed Mar. 28, 2022, and entitled "BACKLIGHT MODULE AND DISPLAY APPARATUS".

FIELD

The present disclosure relates to the technical field of display, and in particular to a backlight module and a display apparatus.

BACKGROUND

The thin film transistor-liquid crystal display (TFT-LCD) features a small size, low power consumption, and no radiation, and thus dominates the market of existing flat panel displays. As the TFT-LCD develops towards lightness, thinness and narrow frame, the edge-lit light emitting diode (LED) backlight technology is booming rapidly. Under the development trend towards a narrower frame and a larger size, it is found that the effective bonding area available to the LED is limited by the narrow frame in the traditional backlight technology, and accordingly, the LED is bonded loosely, thereby affecting the display effect of the entire TFT-LCD.

SUMMARY

Disclosed are a backlight module and a display apparatus, which are used for ensuring a display effect of a narrow-frame display apparatus.

In order to realize the objective described above, the present disclosure provides the following technical solution.

In a first aspect, the present disclosure provides a backlight module. The backlight module includes:
- a light guide plate, the light guide plate being provided with a light emitting surface, a bottom surface arranged opposite the light emitting surface, and a light incident surface connecting the light emitting surface with the bottom surface, the light emitting surface being divided into a light emitting region and a peripheral region surrounding the light emitting region;
- a lamp bar having a light emergent direction facing the light incident surface; and
- a circuit board connected with the lamp bar and positioned at a side of the bottom surface of the light guide plate, an overlapping portion between the circuit board and the light guide plate being formed into a connection region, and an orthographic projection, on the light emitting surface, of the connection region completely covers the peripheral region and at least partially covers the light emitting region.

The light guide plate provided by the present disclosure is provided with the light emitting surface, the bottom surface, and the light incident surface, and the lamp bar has the light emergent direction facing the light incident surface. Light emitted out from the lamp bar enters from the light incident surface of the light guide plate and then is emitted out from the light emitting surface. A linear light source of the lamp bar is converted into a surface light source through the light guide plate, so that the light emergent from the light emitting surface is more uniform. The circuit board connected with the lamp bar is positioned at a side of the bottom surface of the light guide plate. The overlapping portion between the circuit board and the light guide plate is formed into the connection region. Relative positions of the lamp bar and the light guide plate are fixed through the connection region. The orthographic projection, on the light emitting surface, of the connection region completely covers the peripheral region B and partially covers the light emitting region A, that is, through the connection region, a connection area between the lamp bar and the light guide plate is equal to an area of the peripheral region B plus part of an area of the light emergent area A, so that the connection area of the connection region is expanded, and the relative positions of the lamp bar and the light guide plate are fixed. Therefore, light rays emitted by the lamp bar into the light guide plate are uniform, and light rays emergent from the light emitting surface of the light guide plate are also uniform, to improve a working efficiency of the backlight module. The backlight module is simple in entire structure without adding other adhesives.

Optionally, the orthographic projection of the connection region completely on the light emitting surface overlaps the light emitting region.

Optionally, a surface of a side of the circuit board facing the light guide plate is provided with a reflective layer.

Optionally, the connection region is provided with a connection structure, the connection structure being positioned between the reflective layer and the light guide plate, and the connection structure being reused as a dot structure of the light guide plate.

Optionally, an overlapping area between the connection structure and the light guide plate is greater than a display region of the light guide plate.

Optionally, the connection structure includes several dot type microstructures, the number of the dot type microstructures in a unit area being increased gradually in a direction away from the light incident surface.

Optionally, a projection, on the light guide plate, of the dot type microstructure is circular.

Optionally, the dot type microstructure has a diameter increased gradually from a direction close to the light incident surface to a direction away from the light incident surface.

Optionally, the dot type microstructure is made of a fixing adhesive.

Optionally, the dot type microstructure has a different refractive index from the light guide plate.

Optionally, the backlight module further includes a backplane positioned at a side of the bottom surface of the light guide plate.

Optionally, an orthographic projection, on the backplane, of the circuit board is greater than or equal to the sum of an orthographic projection of the light guide plate on the backplane and an orthographic projection of the lamp bar on the backplane.

Optionally, the backlight module further includes: a scattering plate and a prism structure which are sequentially arranged on a side of the light emitting surface of the light guide plate.

In a second aspect, the present disclosure further provides a display apparatus. The display apparatus includes any one of the backlight modules in the first aspect.

Reference numerals: D—gap: 1—light guide plate: 1'—light guide plate: 11—light emitting surface: A—light emitting region: B—peripheral region: 12—bottom surface: 13—light incident surface: 2—lamp bar: 2'—lamp bar: 3—circuit board: 3'—circuit board: 31—reflective layer: 4—reflective plate: 5—connection structure: 51—dot type microstructure: 6—backplane: 61—front frame: 7—scattering plate: 8—prism structure: 9—connector; and 10—printed circuit board.

DETAILED DESCRIPTION OF THE EMBODIMENTS

The technical solutions in embodiments of the present disclosure are clearly and completely described below with reference to the accompanying drawings in the embodiments of the present disclosure. Apparently, the described embodiments are merely some embodiments rather than all embodiments of the present disclosure. Based on the embodiments of the present disclosure, all other embodiments obtained by those of ordinary skill in the art without making creative efforts fall within the scope of protection of the present disclosure.

As the TFT-LCD develops towards lightness, thinness and narrow frame, the edge-lit light emitting diode (LED) backlight technology is booming rapidly. Under the development trend towards a narrower frame and a larger size, it is found that the effective bonding area available to the LED is limited by the narrow frame in the traditional backlight technology, and accordingly, the LED is bonded loosely, thereby affecting the display effect of the entire TFT-LCD.

Figure 1:
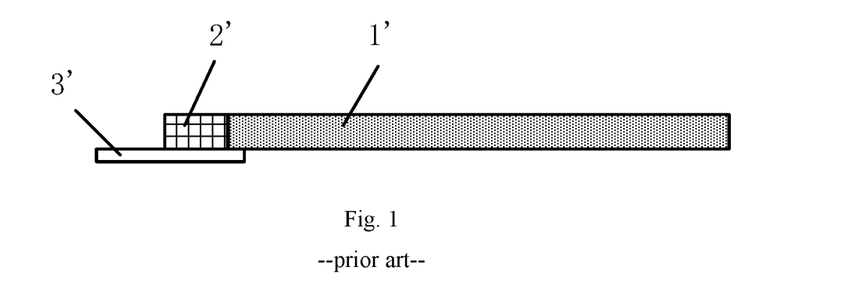
FIG. 1 is a schematic structural diagram of a backlight module in the related art.
Figure 2:
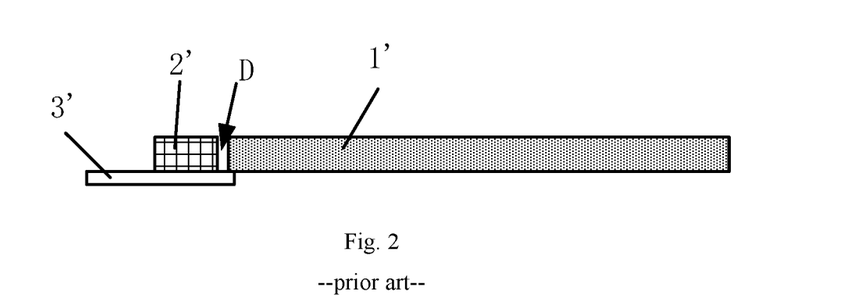
FIG. 2 is a schematic structural diagram of a backlight module disturbed by an external environment in the related art.

FIG. 1 is a schematic structural diagram of a backlight module in the related art. In FIG. 1, a lamp bar 2' is electrically connected with a circuit board 3', so that power is supplied to the lamp bar 2' through the circuit board 3'. Light emitted by the lamp bar 2' enters from a light incident surface of a light guide plate 1' and then is emitted out from a light emitting surface. A linear light source of the lamp bar 2' is converted into a surface light source through the light guide plate 1', so that the light emergent from the light emitting surface is more uniform. In order to ensure the amount of light rays from the lamp bar 2' entering the light guide plate 1', it is required to ensure a distance between the lamp bar 2' and the light guide plate 1', that is, it is required to fix the circuit board 3' electrically connected with the lamp bar 2' and the light guide plate 1'. However, when the lamp bar 2' works continuously, a local temperature will be extremely high, so that the connection between the light guide plate 1' and the circuit board 3' is unstable and even fails at some positions. Consequently. FIG. 2 is a schematic structural diagram of a backlight module disturbed by an external environment in the related art. In FIG. 2, a gap D exists between the light guide plate 1' and the lamp bar 2". In the presence of the gap D, display becomes black, and a display effect of an entire TFT-LCD is affected.

Figure 3:
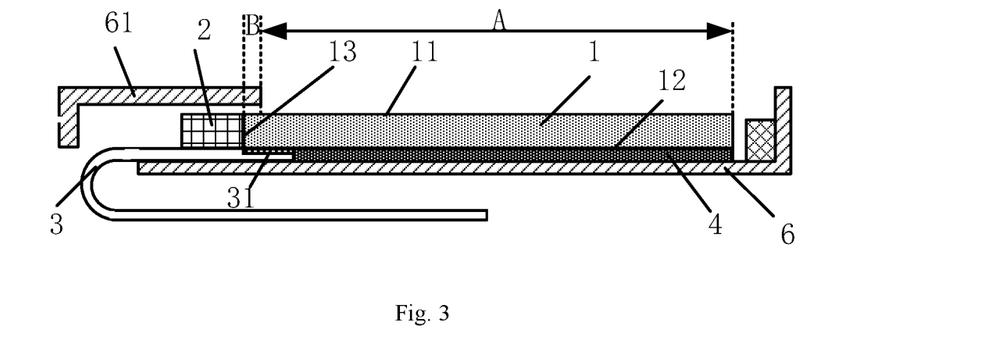
FIG. 3 is a schematic regional diagram of a light guide plate in a backlight module according to an embodiment of the present disclosure.

As shown in FIG. 3, embodiments of the present disclosure provide a backlight module. The backlight module includes:

a light guide plate 1, the light guide plate 1 is provided with a light emitting surface 11, a bottom surface 12 arranged opposite the light emitting surface 11, and a light incident surface 13 connecting the light emitting surface 11 with the bottom surface 12, the light emitting surface 11 is divided into a light emitting region A and a peripheral region B surrounding the light emitting region A:

a lamp bar 2 having a light emergent direction facing the light incident surface 13; and a circuit board 3 connected with the lamp bar 2 and positioned at a side of the bottom surface 12 of the light guide plate 1, an overlapping portion between the circuit board 3 and the light guide plate 1 is formed into a connection region, and an orthographic projection, on the light emitting surface 11, of the connection region completely covers the peripheral region B and at least partially covers the light emitting region A.

It should be noted that the light guide plate 1 provided by the present disclosure is provided with the light emitting surface 11, the bottom surface 12, and the light incident surface 13, and the lamp bar 2 has the light emergent direction facing the light incident surface 13. Light emitted out from the lamp bar 2 enters from the light incident surface 13 of the light guide plate 1 and then is emitted out from the light emitting surface 11. A linear light source of the lamp bar 2 is converted into a surface light source through the light guide plate 1, so that the light emergent from the light emitting surface 11 is more uniform. The circuit board 3 connected with the lamp bar 2 is positioned at a side of the bottom surface 12 of the light guide plate 1. The overlapping portion between the circuit board 3 and the light guide plate 1 is formed into the connection region. Relative positions of the lamp bar 2 and the light guide plate 1 are fixed through the connection region. The orthographic projection, on the light emitting surface 11, of the connection region is completely covers the peripheral region B and partially covers the light emitting region A, that is, through the connection region, a connection area between the lamp bar 2 and the light guide plate 1 is equal to an area of the peripheral region B plus part of an area of part of the light emergent area A, so that the connection area of the connection region is expanded, and the relative positions of the lamp bar 2 and the light guide plate 1 are fixed. Therefore, the light rays emitted by the lamp bar 2 into the light guide plate 1 are uniform, and the light rays emergent from the light emitting surface 11 of the light guide plate 1 are also uniform, thereby improving a working efficiency of the backlight module. The backlight module is simple in entire structure without adding other adhesives.

Certainly, under the development trend towards a narrower frame and a larger size, in order to narrow the frame, a flexible printed circuit board (FPC) is selected as the circuit board 3, and the flexible printed circuit board is directly bent to a rear side of the backplane 6, that is, the flexible printed circuit board is directly bent to a side, away from the light guide plate 1, of the backplane 6.

With reference to FIG. 3 continuously, the backlight module in FIG. 3 includes a front frame 61. The light emitting surface 11 of the light guide plate 1 is partially shielded by the front frame 61. A portion, shielded by the front frame 61, of the light guide plate 1 is the peripheral region B. and a portion, unshielded by the front frame 61, of the light guide plate 1 is the light emitting region A.

In some embodiments, the circuit board 3 is the flexible printed circuit board (FPC). By extending the flexible printed circuit board beyond the peripheral region B, a region where the flexible printed circuit board contacted with the light guide plate 1 is the connection region. Since the flexible printed circuit board extends beyond the peripheral region B, the area of the connection area is expanded, that is, through the connection region, the connection area between the lamp bar 2 and the light guide plate 1 is the area of the peripheral region B plus part of area of the light emitting region A, so that the connection area of the connection region is expanded. Therefore, the lamp bar 2 is effectively prevented from being separated from the light guide plate 1, the relative positions of the lamp bar 2 and the light guide plate 1 are fixed, the light rays emitted by the lamp bar 2 into the light guide plate 1 are uniform, and the light rays emergent from the light emitting surface 11 of the light guide plate 1 are also uniform, thereby improving the working efficiency of the backlight module. The backlight module is simple in entire structure without adding other adhesives.

Figure 4:
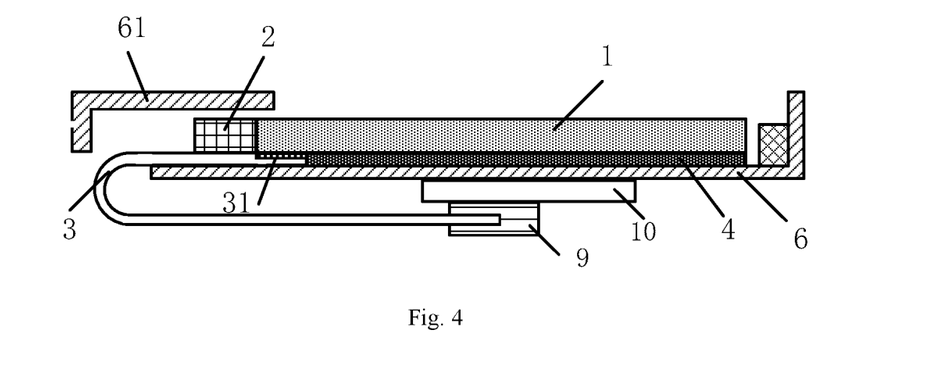
FIG. 4 is a schematic structural diagram of a backlight module according to an embodiment of the present disclosure.

In FIG. 4, in order to increase utilization rate of a light ray of the lamp bar 2, a reflective layer 31 is formed on a side of the circuit board 3 facing the light guide plate 1, and a reflective plate 4 is arranged at another position of the light emitting region A of the light guide plate 1. In order to ensure that the light emitting surface 11 of the light guide plate 1 is parallel to the backplane 6, the circuit board 3 provided with the reflective layer 31 and the reflective plate 4 have the same film layer height, and the reflective plate 4 makes direct contact with the circuit board 3 without a gap.

For ease of understanding, a specific working principle of the backlight module is described as follows: the LED lamp bar 2 is placed on a side surface, and then the linear light source is converted into the surface light source through the light guide plate 1, so that the light is more uniform. The light passes through a scattering plate 7, and the scattering plate is to expand a light scattering area while making the light more uniform and softer. After passing through the scattering plate, the light also passes through a prism structure 8. The prism structure 8 is configured to concentrate the scattered light rays to a certain angle, so that only light rays conforming to the certain angle will be emitted out from the prism structure 8, and light rays not conforming to the angle will be reflected back to the reflective layer 31 or the reflective plate 4 below, and then emitted out from the reflective layer 31 or the reflective plate 4 towards the prism structure 8, so that the light rays not conforming to the angle are re-utilized. The light rays are scattered in all directions, but no matter whether a mobile phone or a display is used, a person faces a screen, accordingly, the light rays should be scattered in a direction facing the person as much as possible, and thus the prism structure 8 is added, so as to improve the brightness of the screen.

Figure 5:
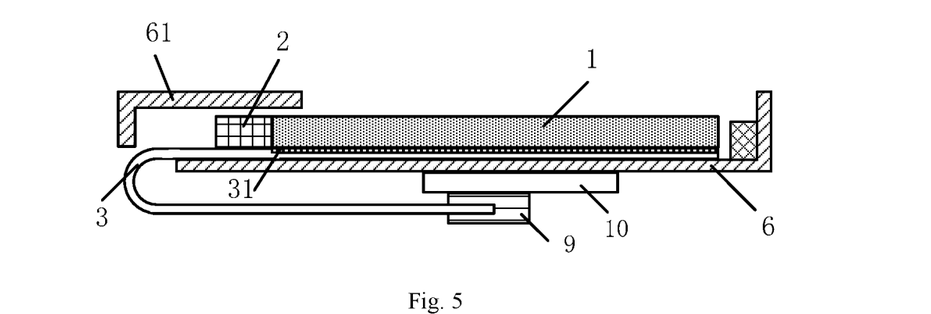
FIG. 5 is a schematic structural diagram of another backlight module according to an embodiment of the present disclosure.

In order to simplify a preparation process, as shown in FIG. 5, the orthographic projection, on the light emitting surface 11, of the connection region completely overlaps the light emitting region A, that is, the flexible printed circuit board extends beyond the peripheral region B and completely overlaps the light emitting region A. A contact region between the flexible printed circuit board and the light guide plate 1 is the connection region. Since the flexible printed circuit board extends beyond the peripheral region B and completely covers the light emitting region A, the area of the connection region is greatly expanded. That is, through the connection region, the connection area between the lamp bar 2 and the light guide plate 1 is the area of the peripheral region B plus the area of the light emitting region A, so that the connection area of the connection region is expanded. Therefore, the lamp bar 2 is effectively prevented from being separated from the light guide plate 1, the relative positions of the lamp bar 2 and the light guide plate 1 are fixed, the light rays emitted by the lamp bar 2 into the light guide plate 1 are uniform, and the light rays emergent from the light emitting surface 11 of the light guide plate 1 are also uniform, thereby improving the working efficiency of the backlight module. The backlight module is simple in entire structure without adding other adhesives.

In FIG. 5, in order to increase the utilization rate of the light ray of the lamp bar 2, a side, facing the light guide plate 1, of the circuit board 3 is provided with an entire layer of reflective layer 31, and through the reflective layer 31, the light rays reflected back to the lower side is re-utilized.

Figure 6:
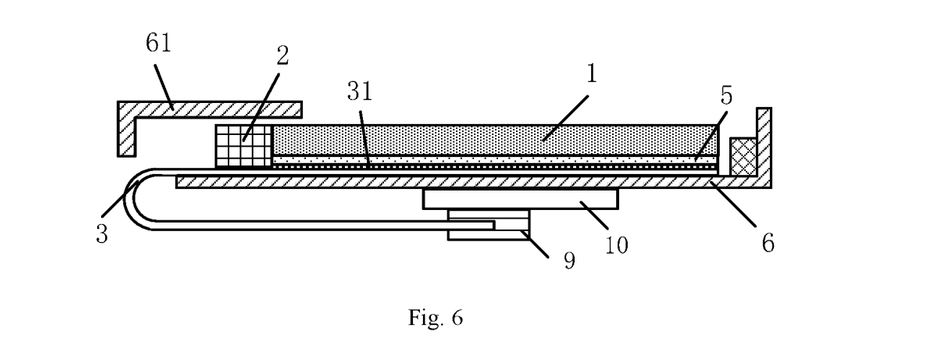
FIG. 6 is a schematic structural diagram of yet another backlight module according to an embodiment of the present disclosure.

As shown in FIG. 6, in order to improve the connection performance between the circuit board 3 and the light guide plate 1, a connection structure 5 is provided in the connection region, and the connection structure 5 is positioned between the reflective layer 31 and the light guide plate 1. However, if a new connection structure 5 is introduced, the optical performance of the light rays will be affected to a certain extent, and the display effect of the entire TFT-LCD may be affected. Therefore, the connection structure 5 is reused as a dot structure of the light guide plate 1.

In some embodiments, an overlapping area between the connection structure 5 and the light guide plate 1 is greater than a display region of the light guide plate 1, that is, part of the connection structure 5 overlaps the peripheral region B of the light guide plate 1.

With reference to FIGS. 4-6 continuously, the circuit board 3 is connected with a printed circuit board 10 through a connector 9, and the lamp bar 2 is controlled through the printed circuit board 10. Certainly, both the reflective layer 31 and a control layer of other components, such as touch control may be formed on a side of the circuit board 3 facing the light guide plate 1.

Figure 7:
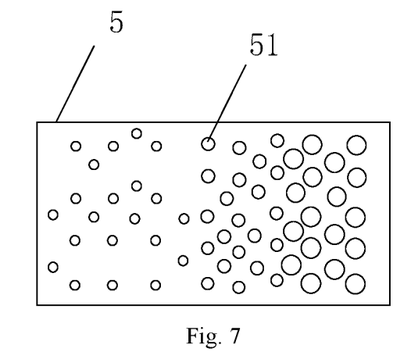
FIG. 7 is a schematic planar diagram of a connection structure according to an embodiment of the present disclosure.

As shown in FIG. 7, the connection structure 5 includes several dot type microstructures 51, the number of the dot-type microstructures 51 in a unit area being increased gradually in a direction away from the light incident surface 13. The dot type microstructure 51 has a diameter increased gradually from a direction close to the light incident surface 13 to a direction away from the light incident surface 13. That is, dot type microstructures 51 on a side close to the lamp bar 2 are small in area and sparse in density, and dot type microstructures 51 on a side away from the lamp bar 2 are large in area and high in density.

For example, a projection, on the light guide plate 1, of the dot type microstructure 51 is circular. Certainly, a specific shape of the dot type microstructure 51 is not particularly limited, as long as a uniform surface light source may be formed on the light guide plate 1.

In order to form the uniform surface light source on the light guide plate 1, the dot type microstructures 51 are arranged as irregularly as possible at intervals. Since when the light rays are reflected and refracted to the light emitting surface 11 of the light guide plate 1 through regularly-arranged dots, it is impossible to form the uniform surface light source, and a visible dot phenomenon tends to occur on a display panel.

The dot type microstructure 51 described above is made of a fixing adhesive. The fixing adhesive is employed as the dot type microstructure 51, so that the light guide plate 1 is bonded to the circuit board 3 while the uniform surface light source may be formed on the light guide plate 1.

In order to ensure that the light rays emergent from the lamp bar 2 are reflected and scattered and then emitted out from the light emitting surface 11 of the light guide plate 1, the dot type microstructures 51 has a different refractive index from the light guide plate 1.

In some implementation modes, the backlight module further includes a backplane 6 positioned at a side of the bottom surface 12 of the light guide plate 1, the backplane 6 being mainly for supporting.

Optionally: an orthographic projection, on the backplane 6, of the circuit board 3 is greater than or equal to the sum of an orthographic projection of the light guide plate 1 on the backplane 6 and an orthographic projection of the lamp bar 2 on the backplane 6. By expanding the contact area between the circuit board 3 and the light guide plate 1 as well as the lamp bar 2, that is, expanding the area of the connection region, that is, through the connection region, the connection area between the lamp bar 2 and the light guide plate 1 is the area of the entire peripheral region B plus the area of the entire light emitting region A, so that the connection area of the connection region is expanded. Therefore, the relative positions of the lamp bar 2 and the light guide plate 1 are fixed, the light rays emitted by the lamp bar 2 into the light guide plate 1 are uniform, and the light rays emergent from the light emitting surface 11 of the light guide plate 1 are also uniform, thereby improving the working efficiency of the backlight module. The backlight module is simple in entire structure.

Figure 8:
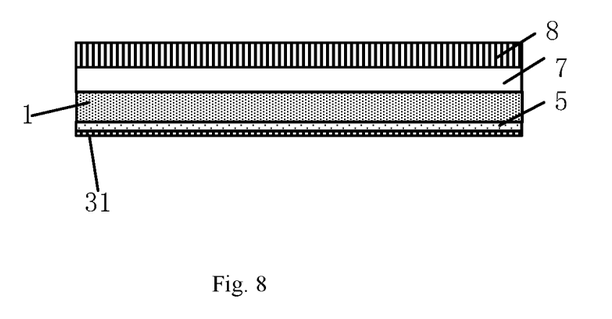
FIG. 8 is a schematic diagram of a film layer of a backlight module according to an embodiment of the present disclosure.

As shown in FIG. 8, in some implementation modes, the backlight module further includes: a scattering plate 7 and a prism structure 8 which are sequentially arranged on a side of the light emitting surface 11 of the light guide plate 1.

The scattering plate is to expand the light scattering area while making the light more uniform and softer. The prism structure 8 is to concentrate the scattered light rays to a certain angle, so that only the light rays conforming to the certain angle will be emitted out from the prism structure 8, and the light rays not conforming to the angle will be reflected back to the reflective layer 31 or the reflective plate 4 below, and then emitted out from the reflective layer 31 or the reflective plate 4 towards the prism structure 8, so that a part of the light rays not conforming to the angle are re-utilized. The light rays are scattered in all directions, but no matter whether a mobile phone or a display is used, a person faces a screen, accordingly, the light rays should be scattered in a direction facing the person as much as possible, and thus the prism structure 8 is added, to improve the brightness of the screen.

Based on the same disclosure concept, the embodiment of the present disclosure further provides a display apparatus. The display apparatus includes the above backlight module according to the embodiments of the present disclosure. The display apparatus can be any product or component with a display function, such as a mobile phone, a tablet computer, a television, a display, a notebook computer, a digital photo frame, and a navigator. Other essential components of the display apparatus should all be understood by those of ordinary skill in the art, and are not repeated herein, nor are they intended to limit the present disclosure. Reference can be made to the embodiments of the backlight module described above for implementation of the display apparatus, the repetitions of which will not be repeated herein.

Apparently, those skilled in the art can make various modifications and variations to the embodiments of the present disclosure without departing from the spirit and scope of the present disclosure. In this way, if the modifications and variations of the present disclosure fall within the scope of claims of the present disclosure and their equivalents, the present disclosure is also intended to encompass these modifications and variations.

What is claimed is:

1. A backlight module, comprising:
a light guide plate, the light guide plate is provided with a light emitting surface, a bottom surface arranged opposite the light emitting surface, and a light incident surface connecting the light emitting surface with the bottom surface, the light emitting surface is divided into a light emitting region and a peripheral region surrounding the light emitting region;
a lamp bar having a light emergent direction facing the light incident surface; and
a circuit board connected with the lamp bar and positioned at a side of the bottom surface of the light guide plate, wherein a region where the circuit board is connected with the lamp bar serves as a connection region, and an orthographic projection of the connection region on the light emitting surface completely covers in the peripheral region and at least partially covers the light emitting region;
wherein a surface of a side of the circuit board facing the light guide plate is provided with a reflective layer, and the reflective layer is located in the connection region;
a reflective plate is provided in the light emitting region except for a region that overlaps with the orthographic projection of the connection region on the light emitting surface, and the reflective plate is positioned at the side of the bottom surface of the light guide plate;
a sum of a thickness of the reflective layer and a thickness of the circuit board in the connection region is equal to a thickness of the reflective plate.

2. The backlight module according to claim 1, wherein the orthographic projection of the connection region on the light emitting surface completely overlaps the light emitting region.

3. The backlight module according to claim 1, wherein the connection region is provided with a connection structure, the connection structure is positioned between the reflective layer and the light guide plate, and the connection structure is provided with a dot structure.

4. The backlight module according to claim 3, wherein an overlapping area between the connection structure and the light guide plate is greater than an area of a display region of the light guide plate.

5. The backlight module according to claim 3, wherein the connection structure comprises several dot type microstructures, a quantity of the dot type microstructures in a unit area is increased gradually in a direction away from the light incident surface.

6. The backlight module according to claim 5, wherein a projection of the dot type microstructure on the light guide plate is circular.

7. The backlight module according to claim 6, wherein the dot type microstructure has a diameter increased gradually from a direction close to the light incident surface to a direction away from the light incident surface.

8. The backlight module according to claim 5, wherein the dot type microstructure is made of a fixing adhesive.

9. The backlight module according to claim 8, wherein the dot type microstructure has a different refractive index from the light guide plate.

10. The backlight module according to claim 1, further comprising a backplane positioned at a side of the bottom surface of the light guide plate.

11. The backlight module according to claim 10, wherein an orthographic projection of the circuit board on the backplane is greater than or equal to the sum of an orthographic projection of the light guide plate on the backplane and an orthographic projection of the lamp bar on the backplane.

12. The backlight module according to claim 1, further comprising: a scattering plate and a prism structure which are sequentially arranged on a side of the light emitting surface of the light guide plate.

13. A display apparatus, comprising the backlight module according to claim 1.

\* \* \* \* \*

UNITED STATES PATENT AND TRADEMARK OFFICE
CERTIFICATE OF CORRECTION

Page 1 of 1

PATENT NO.         : 12,216,307 B2
APPLICATION NO.    : 18/026329
DATED              : February 4, 2025
INVENTOR(S)        : Hailong Li et al.

It is certified that error appears in the above-identified patent and that said Letters Patent is hereby corrected as shown below:

On the Title Page

Column 1 Line 2 Item (73) should read:
Assignees: Hefei Xinsheng Optoelectronics Technology Co., Ltd., Hefei, Anhui (CN); BOE Technology Group Co., Ltd., Beijing (CN)

Signed and Sealed this
Eleventh Day of March, 2025

Coke Morgan Stewart
*Acting Director of the United States Patent and Trademark Office*